June 4, 1968   F. L. THUMMA   3,386,703
PORTABLE WHEEL STAND
Filed Feb. 23, 1967
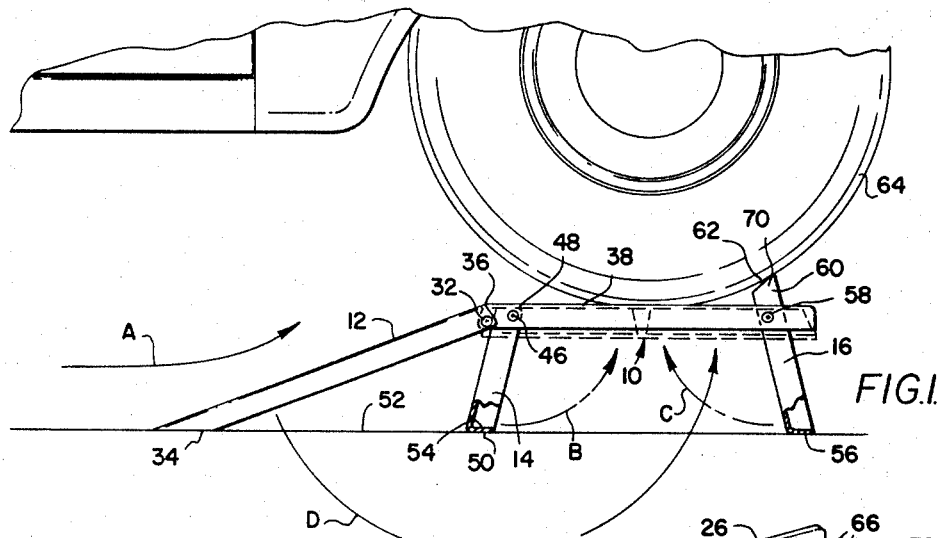
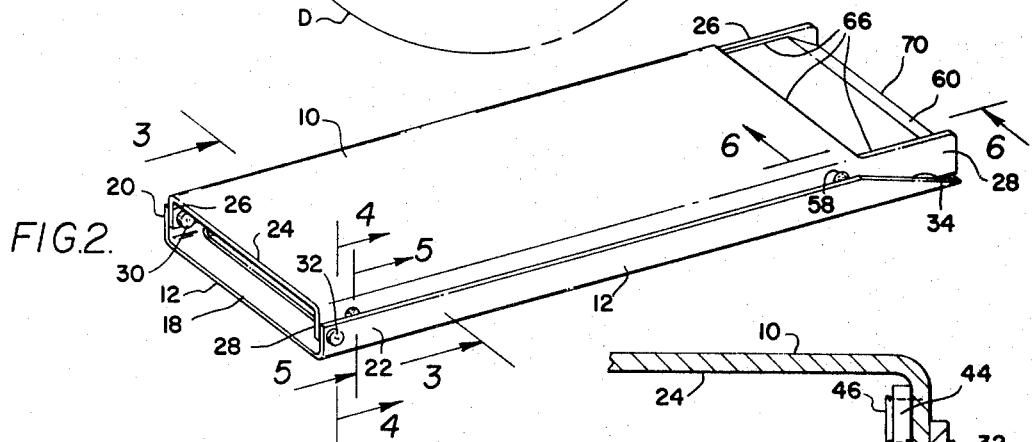
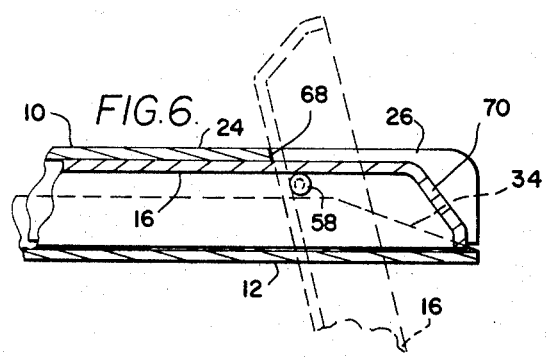
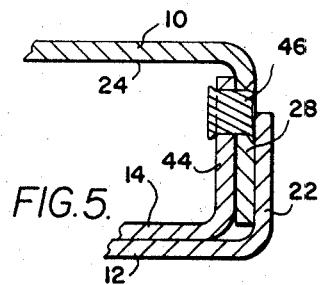
INVENTOR.
FRANCIS L. THUMMA
BY
Wm. H. Dean

United States Patent Office 3,386,703
Patented June 4, 1968

3,386,703
PORTABLE WHEEL STAND
Francis L. Thumma, 3714 W. Rose Lane,
Phoenix, Ariz. 85019
Filed Feb. 23, 1967, Ser. No. 617,871
2 Claims. (Cl. 254—88)

ABSTRACT OF THE DISCLOSURE

A portable wheel stand, wherein a platform member is supported above the ground upon downwardly extending legs; a ramp member being pivotally mounted to the platform member and extending on an incline from the ground to the upper portion of the platform member; the leg members and ramp member being pivotally connected with the platform member so as to be foldable into compact relationship, such that the leg members and the ramp member are in substantially contiguous parallel relation with the platform member.

Background of the invention

This invention relates to a portable wheel stand, and more particularly to a portable wheel stand upon which vehicle wheels may be driven for elevating the vehicle relative to the ground.

Various vehicle jacks, ramp platforms, and other devices have been used for the purpose of elevating a vehicle above the surface of the ground in order that convenience may be had during maintenance or repair work on the vehicle.

Devices of the prior art comprise ramp-type platform structures upon which vehicles may be driven, and thereby elevated to a position in which the wheels are substantially above the level of the ground. In this position, the vehicle may be serviced from beneath to accomplish various repair and maintenance work.

The prior art devices, however, are of bulky structure, and do not lend themselves to convenient storage of such ramp devices, either in garage facilities or in the alloted space for such items within a vehicle.

Summary of the invention

The portable wheel stand of the present invention is particularly adapted for supporting automotive vehicles in elevated position above the ground so that maintenance or repair work may readily be carried on by mechanics under the vehicle. This invention comprises a drive on platform, including an inclined ramp, which extends from the ground to the upper level of the platform, which is supported in elevated position above the ground by legs which are pivotally connected to the platform, and foldable relative thereto. The foldable character of the wheel stand of the invention, includes means for folding the inclined ramp and the supporting legs into substantially parallel contiguous relationship with the platform member of the invention so that the entire structure thereof is very neat and compact, and may readily be stowed in garage areas or in tool storage areas of vehicles, which may at times be driven onto the wheel stands of the invention. It is contemplated that a pair of wheel stands, in accordance with the present invention, will be used to at least elevate the front or rear wheels of a vehicle or four of the stands may be used to elevate all four wheels, if desired.

The platform and ramp members, as well as the supporting legs of the invention, are channel-shaped in cross section, and all have adjacent flanges pivotally connected together, while one of the leg members is provided with a wheel stopping portion which extends above the level of the platform member, when in position supporting the platform member in elevated position above the ground.

Accordingly, it is an object of the present invention to provide a portable wheel stand particularly adapted for elevating automotive vehicles above the surface of the ground, when they are driven onto the platform of the invention; said wheel stand being so constructed that the platform member and pivotally mounted legs supporting the same, as well as the ramp member of the invention, may all be pivoted into very compact relation to each other to provide for convenience in stowing the wheel stand of the invention, when not in use.

Another object of the invention is to provide a portable wheel stand of novel construction comprising channel-shaped in cross-section structures having adjacent flanges pivoted together to provide for compact folding of the various portions of the wheel stand together.

Another object of the invention is to provide a novel wheel stand having a platform member provided with downwardly diverging pivotally connected legs, one of which provides a wheel stop member at the opposite end of the platform member from the pivotal connection of the inclined ramp structure thereof, all of which provides for safety in the use of the wheel stands, when an automotive vehicle, or the like, is driven thereonto.

Further objects and advantages of the invention may be apparent from the following specification, appended claims, and accompanying drawings:

Brief description of the drawings

FIG. 1 is a side elevational view of a portable wheel stand, in accordance with the present invention, and illustrating fragmentarily a portion of an automotive vehicle having one of its wheels supported on the platform of the wheel stand of the invention, and illustrating by arrows the relative direction of pivotal movement of the legs and the ramp of the wheel stand relative to the platform member thereof, when converting the wheel stand from the attitude shown in FIG. 1 to a folded collapsed disposition, as shown in FIG. 2;

FIG. 2 is a perspective view of the wheel stand of the invention, shown in collapsed form, ready for stowing;

FIG. 3 is a transverse sectional view taken from the line 3—3 of FIG. 2;

FIG. 4 is an enlarged fragmentary sectional view taken from the line 4—4 of FIG. 2;

FIG. 5 is an enlarged fragmentary sectional view taken from the line 5—5 of FIG. 2; and FIG. 6 is an enlarged fragmentary sectional view taken from the line 6—6 of FIG. 2.

Description of the preferred embodiments

As shown in FIG. 1 of the drawings, the portable wheel stand of the invention comprises a platform member 10, a ramp member 12, and leg means comprising a pair of leg members 14 and 16.

The platform member 10, ramp 12, and leg members 14 and 16 are all channel-shaped in cross-section structures, and relatively foldable into very compact relation to each other, as indicated in FIG. 2 of the drawings.

The ramp member 12, as shown in FIG. 2 of the drawings, is an elongated channel-shaped in cross-section structure comprising a central web portion 18 having integral flanges 20 and 22. The platform member 10 is an elongated channel-shaped in cross-section member having a central web portion 24 and exposed flanges 26 and 28.

A pivot pin 30 extends through the flange portions 20 and 26 of the ramp and platform members 12 and 10, respectively, and another pivot pin 32 extends through the flange portions 22 and 28 of the ramp and platform members 12 and 10, respectively. The axes of the pins 30 and 32 are substantially aligned, and are disposed generally horizontally when the wheel stand of the invention is in use, as shown in FIG. 1 of the drawings. The ramp member 12, at its flange portions 20 and 22, is bevelled, as indicated at 34 in FIGS. 1 and 2 of the drawings, such that these flange portions and the web portions 18 rest on the ground, while a normally upper end portion 36 of the ramp member 12 is supported generally at an upper surface 38 of a platform member 10 coinciding with the upper surface of the web portion 24 of the channel-shaped in cross-section platform member 10.

The leg member 14 is provided with a central web portion 40, and a pair of flange portions 42 and 44, which are disposed adjacent flanges 26 and 28 of the channel-shaped in cross-section shaped platform member 10. A pair of rivets, designated 46, as shown in FIG. 5 of the drawings, pivotally interconnect the flanges 42 and 44 with the flanges 26 and 28, while a normally upper end portion 48 of the leg member 14 is bevelled to form stop means which bears against the web 24 of the platform 10, in order to limit pivotal movement of the leg member 14 about the axis of the pivot pins 46, such that the leg member 14 extends downwardly at an inclined angle toward the end 34 of the ramp member 12. In this position, weight bearing on the platform 38 tends to pivot the leg member 14 so that its stop 48 firmly bears on the web 24 of the platform 10, and thus to hold the leg 14 in secure supporting position beneath the platform member 10.

A lower end 50 of the leg member 14 bears on the surface of the ground or on any other surface, such as asphalt or concrete, as indicated at 52. The lower end 50 of the leg member 14 is provided with a plate portion 54, which is substantially as wide as the depth of the flanges 42 and 44, thus, to provide sufficient bearing at the lower end of the leg member 14 to support the platform 10 on various surfaces, which may have some compressibility.

The leg member 16 is similar to the leg member 14, and is provided with a lower end 56 similar to the lower end 50 of the leg member 14.

The leg member 16 is a channel-shaped in cross-section structure similar to the leg member 14, and provided with pivot pins 58, similar to the pivot pins 46. These pivot pins 58 connect the leg members 16 to the platform 10 and the flanges 24 and 28 thereof in a similar manner to the connection of the leg member 14 with the platform member 10.

The leg member 16 is provided with an upwardly extending wheel stop portion 60 which extends above the upper surface 38 of the platform 10 so as to provide a stop for an automotive wheel approximately at 62, when the wheel is driven onto the platform member 10. This wheel generally designated 64 in FIG. 1 of the drawings, may be an automobile wheel or that of any other vehicle, as desired.

The upwardly extending wheel stop portion 60 of the leg member 16 passes through an opening 66 in the platform member 10, this opening 66 is provided by cutting out the portion of the web 24 between the flanges 26 and 28, all as shown best in FIG. 2 of the drawings.

As shown in FIG. 6 of the drawings, an edge 68 of the web portion 24 in the opening 66 provides stop means for limiting pivotal movement of the leg member 16 so that it extends downwardly and forwardly in diverging relationship with the leg member 14, and in this position, when weight bears upon the leg 16, the weight tends to hold the leg member 16 in forwardly and downwardly angular position relative to the platform 10.

As shown in FIG. 6 of the drawings, the normally upper end and wheel stop portion 60 of the leg member 16 is bevelled at 70 to provide for compatible smooth bearing to be engaged by the periphery of the wheel 64.

In operation, a pair of the wheel stands, as shown in FIG. 1, may be disposed adjacent the front wheels of an automobile, and the automobile may be driven in the direction A to move the wheels up the ramp members 12 and onto the platform member 10, at which time the peripheries of the wheels will engage the bevelled portions 70 of the stop portions of the legs 16 so that the driver of the vehicle will not tend to drive beyond a proper position on the platform members 10.

When the wheel stands of the invention are not in use, they may be collapsed by pivoting the leg members 14 and 16, as indicated by arrows B and C into contiguous parallel relation with the platform member 10, and the ramp member 12, as indicated by an arrow D, may be pivoted into contiguous parallel relation with the platform member 10, and substantially to enclose the leg members 14 and 16.

When in this position, the wheel stop portion 60 and its bevelled portions 70 may be substantially in alignment with the platform member, and the ramp member to form a very neat, compact, folded structure so that it may be stowed either in a garage facility, or in the tool or trunk compartment of a vehicle, as desired.

It will be obvious to those skilled in the art that various modifications of the present invention may be resorted to in a manner limited only by a just interpretation of the following claims.

I claim:

1. In a portable wheel stand, the combination of: an elongated platform member having opposite ends and disposed to be supported in a substantially horizontal position above the surface of the ground; leg means having normally upper portions pivotally connected to said platform member, said leg means movable from a position substantially parallel to said platform member, and into a downwardly directed position, said leg means having normally lower ends disposed to engage the ground, and to support said platform member in said horizontal position; an elongated normally inclined ramp member having a first end pivotally connected to one of said opposite ends of said platform member; said ramp member having a second end disposed to rest on the ground so as to maintain said ramp member in an inclined position, and extending from the ground to substantially the level of said platform member, said ramp member pivotally movable relative to said platform member so as to permit said ramp member and said leg means to be disposed in substantially contiguous parallel relation to said platform member and stop means for limiting the downwardly pivotal movement of said leg members relative to said platform member, said stop means disposed to hold said leg members in a forwardly and rearwardly downwardly diverging relation to each other.

2. The invention, as defined in claim 1, wherein: a first one of said leg members is pivoted to one end of said platform member near said ramp member; a second one of said leg members is pivoted to said platform near the other end of said platform member, said second one of said leg members having a wheel stopping upper end portion projecting above said platform member, when said leg member is pivoted downwardly to a position wherein the lower end thereof is engaged with the ground; said platform member being channel shaped and having a pair of spaced flange portions, said platform member being open between its flange portions at said other end to permit said wheel stopping upper end portion of said leg member to project upwardly between said flange portions and above said platform member.

References Cited

UNITED STATES PATENTS

| | | | |
|---|---|---|---|
| 1,726,988 | 9/1929 | Klein | 254—88 |
| 1,772,590 | 8/1930 | Adams | 254—88 |
| 1,871,129 | 8/1932 | Pierce | 254—88 |
| 1,904,693 | 4/1933 | Meyers et al. | 254—88 |
| 3,178,156 | 4/1965 | Rigers | 254—88 |

FOREIGN PATENTS 296,898   9/1928   Great Britain.

OTHELL M. SIMPSON, *Primary Examiner.*